United States Patent [19]

Barren et al.

[11] Patent Number: 5,786,411
[45] Date of Patent: Jul. 28, 1998

[54] LIGHT RESISTANT COMPOSITIONS OF POLYCARBONATE AND GRAFT COPOLYMER RESINS

[75] Inventors: James Paul Barren, Scotia; James Edward Pickett, Schenectady, both of N.Y.

[73] Assignee: General Electric Company, Pittsfield, Mass.

[21] Appl. No.: 772,228

[22] Filed: Dec. 20, 1996

[51] Int. Cl.$^6$ .................................................. C08K 5/3435
[52] U.S. Cl. .................... 524/102; 525/205; 525/327.6
[58] Field of Search ........................... 524/102; 546/208; 525/205, 327.6

[56] References Cited

U.S. PATENT DOCUMENTS

| | | |
|---|---|---|
| 3,864,428 | 2/1975 | Nakamura et al. ............. 525/67 |
| 4,096,169 | 6/1978 | Chalk . |
| 4,251,435 | 2/1981 | Son et al. . |
| 4,385,143 | 5/1983 | Yachigo et al. . |
| 4,408,000 | 10/1983 | Lee . |
| 4,438,234 | 3/1984 | Rosenquist et al. . |
| 4,446,268 | 5/1984 | Lee . |
| 4,520,171 | 5/1985 | Diveley et al. ............. 524/102 |
| 4,525,514 | 6/1985 | Yachigo et al. . |
| 4,578,472 | 3/1986 | Yoshimura et al. . |
| 4,739,000 | 4/1988 | Burton . |
| 4,816,585 | 3/1989 | Raynor et al. . |
| 4,863,999 | 9/1989 | MacLeay et al. . |
| 4,866,136 | 9/1989 | MacLeay ................... 524/102 |
| 4,904,714 | 2/1990 | Raynor et al. . |
| 4,957,974 | 9/1990 | Llenda et al. . |
| 4,981,915 | 1/1991 | MacLeay et al. . |
| 4,990,545 | 2/1991 | Hourai et al. . |
| 5,004,770 | 4/1991 | Cortolano et al. ............. 524/102 |
| 5,013,777 | 5/1991 | MacLeay et al. . |
| 5,023,285 | 6/1991 | Horn . |
| 5,055,507 | 10/1991 | Haruna et al. . |
| 5,096,950 | 3/1992 | Galbo et al. ................ 524/102 |
| 5,104,934 | 4/1992 | Udipi ...................... 525/67 |
| 5,109,076 | 4/1992 | Freitag et al. . |
| 5,124,472 | 6/1992 | Enlow . |
| 5,128,410 | 7/1992 | Llendra et al. . |
| 5,137,950 | 8/1992 | Hobbs et al. . |
| 5,142,083 | 8/1992 | Enlow . |
| 5,159,003 | 10/1992 | Baghali .................... 525/67 |
| 5,162,405 | 11/1992 | MacLeay et al. . |
| 5,176,751 | 1/1993 | Findley . |
| 5,186,993 | 2/1993 | Hallden-Abberton et al. . |
| 5,200,443 | 4/1993 | Hudson .................... 524/102 |
| 5,229,456 | 7/1993 | Llenda et al. . |
| 5,238,979 | 8/1993 | Haruna et al. . |
| 5,242,719 | 9/1993 | Medford et al. . |
| 5,250,606 | 10/1993 | Guest et al. . |
| 5,308,901 | 5/1994 | Hobbs et al. . |
| 5,352,719 | 10/1994 | Myers . |
| 5,391,600 | 2/1995 | Umeda et al. . |
| 5,401,348 | 3/1995 | Oguchi et al. . |
| 5,420,181 | 5/1995 | Eichenauer et al. . |
| 5,424,341 | 6/1995 | Ogoe et al. . |
| 5,424,380 | 6/1995 | Doi . |
| 5,438,086 | 8/1995 | Stevenson et al. . |
| 5,502,153 | 3/1996 | Sakashita et al. . |
| 5,552,480 | 9/1996 | Sugita et al. ............... 525/67 |

FOREIGN PATENT DOCUMENTS

| | | |
|---|---|---|
| 2061037 | 2/1992 | Canada . |
| 0499581A1 | 2/1991 | European Pat. Off. . |
| 499 581 | 2/1991 | European Pat. Off. . |
| 0 434 608 A1 | 6/1991 | European Pat. Off. . |
| 28 15 501 | 10/1979 | Germany . |
| 62-253657 | 11/1987 | Japan ..................... 546/208 |
| 3-204655 | 6/1991 | Japan . |
| 4-159353 | 6/1992 | Japan . |
| 4-159354 | 6/1992 | Japan . |

OTHER PUBLICATIONS

Sanduvor 3058 Brochure, 2-256/96, pp. 1-10.
Uvinul 5050H Brochure.
Anonymous Research Disclosure 35435 Sep. 1993 p. 673, 674, 675.

*Primary Examiner*—Veronica P. Hoke

[57] ABSTRACT

A light resistant polymer composition useful for molding applications is provided. The polymer composition comprises a blend of polycarbonate resin with a graft copolymer resin and an acylated sterically hindered amide. The compositions have improved physical properties as compared to compositions containing hindered amine light stabilizers.

11 Claims, No Drawings

LIGHT RESISTANT COMPOSITIONS OF POLYCARBONATE AND GRAFT COPOLYMER RESINS

BACKGROUND OF THE INVENTION

1. Field of the Invention

The present invention relates to a light resistant polymer composition useful for molding applications. The polymer composition comprises a blend of polycarbonate resin with a graft copolymer resin and an acylated sterically hindered amide. Preferably the graft copolymer resin is a monovinylidene aromatic compound. The present invention also relates to methods of providing light resistant thermoplastic resin compositions and to articles molded with the composition of this invention.

2. Description of the Prior Art

The prior art has disclosed the use of sterically hindered amines for affording light resistance to polymers or thermoplastic molding resins. Such hindered amines tend to degrade polycarbonate resins in part due to chemical reactions involving the carbonate moieties sensitivity. The degradation of the polycarbonate resin results in a loss of molecular weight and an accompanying loss of physical properties of the thermoplastic composition.

An anonymous paper in Research Disclosure (October 1993) discloses a composition of an aromatic polycarbonate, an acrylonitrile-butadiene-styrene (ABS) and a hindered amine compound, optionally with an ultraviolet absorbing compound. The hindered amines disclosed were bis(2,2,6,6,-tetramethyl-4-piperidinyl) sebacate and a polymeric-type hindered amine based upon N,N'-bis((2,2,6,6,-tetramethyl-4-piperidinyl)-1,6-hexanediamine polymer with 2,4,6-trichloro-1,3,5-triazine and 2,4,4-trimethyl-1,2-pentanamine. Both of these hindered amine compounds contain free N—H bonds and acylated sterically hindered amide compounds are not described.

Eichenauer et al. (U.S. Pat. No. 5,420,000) generically described the use of sterically hindered amines at column 5, beginning at line 60 in compositions of an aromatic polycarbonate, acrylonitrile-butadiene-styrene (ABS), and specific polycarboxyl containing additives. N-acyl containing hindered amines are not disclosed.

Lee (U.S. Pat. No. 4,408,000) discloses polycarbonate compositions containing various mold release agents and generically discloses hindered amines as light stabilizing additives.

Birbaum et al. (EP 434608) discloses polycarbonate compositions containing various O-hydroxyphenyl-S-triazine compounds used in combination with hindered amines as light stabilizing additives.

Itoi et al. (EP 694581) discloses polycarbonate resins having specific endgroup ratios in compositions containing impact resistant improving agents such as acrylonitrile-butadiene-styrene (ABS). Hindered amines as light stabilizing additives are generically described.

For successful commercial applications in areas such as automotive interior and exterior molded parts, computer housings and assembled parts, in addition to telecommunications equipment such as cellular phones, the thermoplastic resin needs to maintain good physical properties such as impact properties in addition to resisting color changes when subjected to light.

Therefore, an object of the present invention is to provide a thermoplastic molding composition having good light retardant properties that maintains a good overall balance of physical properties.

SUMMARY OF THE INVENTION

This invention is directed to a thermoplastic resin molding composition having excellent light resistant properties while maintaining good mechanical properties such as heat deflection temperature, impact resistance and flow under abusive molding conditions. Specifically the thermoplastic resin composition is a blend of polycarbonate resin with graft copolymer resin, and an acylated sterically hindered amide. The graft copolymer resin is preferably a monovinylidene aromatic compound.

DETAILED DESCRIPTION OF THE INVENTION

As stated previously, the invention is directed to a light resistant thermoplastic molding composition and to articles molded therefrom. The thermoplastic molding composition comprises a blend of polycarbonate resin with graft copolymer resin, and an acylated sterically hindered amide. The graft copolymer resin is preferably a monovinylidene aromatic compound.

The acylated sterically hindered amide of the present invention has the generic formula (I):

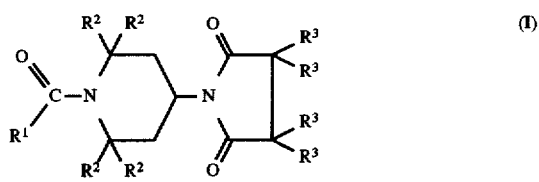

wherein $R^1$ is a $C_1$–$C_{20}$ residue, each $R^2$ is independently a $C_1$ to $C_{20}$ residue, and each $R^3$ is independently hydrogen or a $C_1$ to $C_{25}$ residue with the proviso that at least one $R^3$ is a $C_1$ to $C_{25}$ residue. A preferred acylated sterically hindered amide is wherein $R^1$ and each $R^2$ are methyl and three of $R^3$ are hydrogen and the fourth $R^3$ is a $C_1$ to $C_{25}$ residue, especially a $C_{10}$ to $C_{25}$ residue. An especially preferred acylated sterically hindered amide has the formula (II):

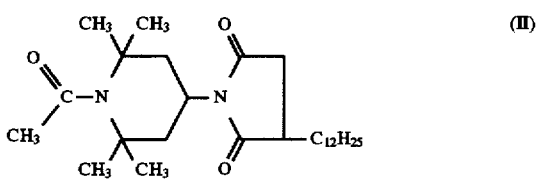

It is believed that when at least one of $R^3$ is a long chain residue (e.g. at least about 6 carbon atoms, preferably at least about 10 carbon atoms) that solubility of the acylated sterically hindered amide with the polymer resins is enhanced.

Polymeric acylated sterically hindered amides are also useful in the present invention. By polymeric acylated sterically hindered amide is meant compounds that contain two or more acylated sterically hindered amides. Polymeric acylated sterically hindered amides include acylated sterically hindered amides wherein $R^3$ in Formula (I) is connected to a triazine ring to afford a tris(acylated sterically hindered amide). Other polymeric acylated sterically hindered amides include acylated sterically hindered amides wherein $R^3$ is connected to a polymer backbone containing multiple acylated sterically hindered amides.

Various ultraviolet absorbers as well as pigments and dyes known in the art may also be used in combination with the acylated sterically hindered amide. More than one acylated sterically hindered amide may also be used.

The amount of an acylated sterically hindered amide compound employed can be that amount of acylated sterically hindered amide compound that renders the resin composition light retardant while maintaining good physical properties, such as, for example, impact resistance and melt viscosity index (MVI). Preferably the composition of the invention contains between about 0.01 weight percent and about 5 weight percent of acylated sterically hindered amide based on the total weight of thermoplastic resin and the acylated sterically hindered amide compound and more preferably between about 0.1 weight percent and about 2 weight percent of acylated sterically hindered amide and most preferably between about 0.3 weight percent and about 1 weight percent of the acylated sterically hindered amide, all based upon the total weight of thermoplastic resin.

In the practice of the invention, the thermoplastic resin employed herein is a blend of aromatic polycarbonate resin and at least one graft copolymer resin. The polycarbonate materials are well known in the art and are, usually prepared by interfacial or melt polymerization and typically comprise structural units of the formula (III):

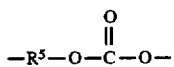

(III)

wherein $R^5$ is a divalent organic radical.

Preferably, at least about 60% and more preferably at least about 80% of the total number of $R^5$ values, and most desirably all of said $R_5$ values, are aromatic. The aromatic $R^5$ radicals preferable have the formula (IV):

(IV)

wherein each of $A_1$ and $A^2$ is a monocyclic divalent aromatic radical and Y is a bridging radical in which one or two atoms separate $A^1$ and $A^2$. The free valence bonds in formula (IV) are usually in the meta or para positions of $A^1$ and $A^2$ in relation to Y.

In formula (IV), the $A^1$ and $A^2$ values may be unsubstituted phenylene or substituted derivatives thereof, illustrative substituents (one or more) being alkyl, alkenyl, halo (especially chloro and/or bromo), nitro, alkoxy and the like. Unsubstituted phenylene radicals are preferred. Both $A^1$ and $A^2$ are preferably p-phenylene, although both may be o-phenylene or m-phenylene, or one o-phenylene or m-phenylene and the other p-phenylene.

The bridging radical, Y, is one in which one or two atoms, preferable one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene (alkylidene) radical. Also included, however, are unsaturated radicals and radicals which contain atoms other than carbon and hydrogen; for example, 2,2-dichloroethylidene, carbonyl, phthalidylidene, oxy, thio, sulfoxy and sulfone. For reasons of availability and particular suitability for the purposes of this invention, the preferred radical of formula (IV) is the 2,2-bis(4-phenylene)propane radical, which is derived from bisphenol A and in which Y is isopropylidene and $A^1$ and $A^2$ are each p-phenylene.

The weight average molecular weight of the polycarbonate material is well known to those skilled in the art but is preferably relatively low for purposes of this invention. However, compositions in which the polycarbonate has a higher molecular weight often have favorable ductility at the expense of decreased flow. The exact molecular weight utilized will depend, in part, on the end-use requirements of the desired application and the degree of molding difficulty encountered in forming the part.

In most instances, the polycarbonate material consists of a homo-polycarbonate or even a copolycarbonate, such as a copoly(ester carbonate). It is also within the scope of the invention, however, to use a blend of a polycarbonate material with another material, e.g., a styrene homopolymer.

Another ingredient of the present invention is the graft copolymer resin. The graft copolymer resin is preferably a graft copolymer resin comprising a rubbery polymeric substrate and a rigid polymeric superstrate. In a preferred embodiment, the graft copolymer comprises more than 30% by weight rubbery polymeric substrate to rigid polymeric superstrate. The graft copolymer resin may also be used in combination with various block copolymer resins, such as, for example, polystyrene-polybutadiene diblock and triblock copolymer resins, polystyrene-poly(ethylene-butylene) diblock and triblock copolymer resins, and polystyrene-poly(ethylene-propylene) diblock and triblock copolymer resins, as well as mixtures of block copolymer resins.

The rubbery polymeric substrate generally comprises repeating units derived from one or more ethylenically unsaturated monomers selected from conjugated diene monomers, non-conjugated diene monomers, ($C_2$–$C_8$)olefin monomers, ($C_1$–$C_{12}$)alkyl acrylate monomers, ethylenically unsaturated nitrile monomers, and vinyl aromatic monomers. Useful ratios of the aforementioned monomers as well as other useful monomers and rubbery polymeric substrates will be apparent to those skilled in the art.

Suitable conjugated diene monomers include, for example, 1,3-butadiene, isoprene, 1,3-heptadiene, methyl-1,3-pentadiene, 2,3-dimethylbutadiene, 2-ethyl-1,3-pentadiene, 1,3-hexadiene, 2,4-hexadiene, dichlorobutadiene, bromobutadiene, and dibromobutadiene as well as mixtures of diene monomers. In preferred embodiments, the conjugated diene monomer is 1,3-butadiene or mixtures of 1,3-butadiene with styrene monomer. Suitable non-conjugated diene monomers include, for example, ethylidene norbornene, dicyclopentadiene, hexadiene, and phenyl norbornene. Those skilled in the art can readily select other useful conjugated and non-conjugated diene monomers.

Useful $C_2$–$C_8$ olefin monomers include compounds having from 2 to about 8 carbon atoms per molecule and having a single site of ethylenic unsaturation per molecule. Suitable ($C_2$–$C_8$)olefin monomers include, for example, ethylene, propene, 1-butene, 1-pentene, heptene. Useful ($C_1$–$C_{12}$) alkyl acrylate monomers include acrylates having straight or branched alkyl substituent groups. The alkyl substituent groups generally have from 1 to about 12 carbon atoms per alkyl group and include, for example, methyl, ethyl, n-butyl, sec-butyl, t-butyl, n-propyl, iso-propyl, pentyl, hexyl, heptyl, octyl, nonyl, decyl, undecyl, and dodecyl. Illustrative examples of suitable ($C_1$–$C_{12}$)alkyl acrylates include butyl acrylate, iso-pentyl acrylate, n-hexyl acrylate, and 2-ethyl hexyl acrylate as well as mixtures of any of the foregoing and mixtures of any of the foregoing with other acrylates such as, for example, ethyl acrylate and methyl acrylate. The ethylenically unsaturated nitrile monomer includes acyclic compounds having a single nitrile group and a single site of ethylenic unsaturation per molecule and includes, for example, acrylonitrile and methacrylonitrile. Those skilled in the art can readily select other suitable ($C_2$–$C_8$)olefin, ($C_1$–$C_{12}$)alkyl acrylate, and ethylenically unsaturated nitrile monomers, as well as useful ratios of monomers.

Suitable vinyl aromatic monomers include, for example, styrene and substituted styrenes having one or more alkyl, alkoxyl, hydroxyl, or halo substituent groups attached to the aromatic ring, including, for example, α-methyl styrene, p-methyl styrene, vinyl toluene, vinyl xylene, trimethyl styrene, butyl styrene, chlorostyrene, dichlorostyrene, bromostyrene, p-hydroxystyrene, methoxystyrene, and vinyl-substituted condensed aromatic ring structures, such as, for example, vinyl napthalene, vinyl anthracene; as well as mixtures of vinyl aromatic monomers. In a preferred embodiment, the vinyl aromatic monomer, when one is used, is styrene, α-methyl styrene, or mixtures of styrene and α-methyl styrene.

The rubbery polymeric substrate may, optionally, include a minor amount, for example, up to 5% by weight based on the weight of the monomers used for the rubbery substrate, of repeating units derived from a polyethylenically unsaturated crosslinking monomer, for example, butylene diacrylate, divinyl benzene, butene diol dimethacrylate, trimethylolpropane tri(meth)acrylate, allyl methacrylate, diallyl maleate, and triallyl cyanurate. Those skilled in the art will be able to select an appropriate polyethylenically unsaturated crosslinking monomer, when one is desired, as well as an appropriate amount of the monomer without undue experimentation.

In a first preferred embodiment, the substrate comprises repeating units derived from one or more conjugated diene monomers, such as, for example, a substantially homopolymeric polybutadiene rubber. In a second referred embodiment, the substrate comprises repeating units derived from one or more conjugated diene monomers and one or more copolymerizable comonomers selected from vinyl aromatic monomers and ethylenically unsaturated nitrile monomers, such as, for example, styrene-butadiene copolymers, acrylonitrile-butadiene copolymers and styrene-butadiene-acrylonitrile copolymers. In a third preferred embodiment, the substrate comprises repeating units derived from one or more $(C_1-C_{12})$alkyl acrylate monomers, more preferably from one or more monomers selected from butyl acrylate and n-hexyl acrylate including mixtures of one or both of the foregoing with other acrylates such as, for example, ethyl acrylate. In a fourth preferred embodiment, the substrate comprises units derived from one or more olefin monomers and includes, for example, ethylene/propylene copolymers, ethylene/propylene/non-conjugated diene monomer terpolymers.

Suitable rubbery polymeric substrates are made by known processes, for example, emulsion polymerization and mass polymerization. Generally, the rubbery polymeric substrate is made by aqueous emulsion polymerization in the presence of a free radical initiator, for example, an organic peroxide or persulfate initiator or a redox initiator system, and, optionally, in the presence of a chain transfer agent, for example, an alkyl mercaptan. The rubbery polymeric substrate may exhibit a unimodal particle size distribution or a multimodal distribution, such as a bimodal distribution.

The graft copolymer resin, in addition to comprising a rubbery polymeric substrate, also contains a rigid polymeric superstrate. The rigid polymeric superstrate includes repeating units derived monomers selected from the group consisting of $(C_1-C_{12})$alkyl acrylate monomers, vinyl aromatic monomers and ethylenically unsaturated nitrile monomers. One skilled in the art can select an appropriate monomer or combination of monomers to afford a suitable rigid polymeric substrate. Suitable vinyl aromatic monomers and ethylenically unsaturated nitrile monomers are set forth above. As used herein the terminology alkyl acrylate monomers refers collectively to acrylate monomers and methacrylate monomers. Suitable alkyl acrylate monomers include the acrylate monomers disclosed above and their methacrylate analogs such as, for example, methyl methacrylate, ethyl methacrylate, propyl methacrylate, isopropyl methacrylate, butyl methacrylate, hexyl methacrylate, decyl methacrylate, and the like.

In a preferred embodiment, the rigid polymeric superstrate comprises repeating units derived from one or more monomers selected from styrene, α-methyl styrene, and acrylonitrile. In a more preferred embodiment, the superstrate comprises from about 60% to about 90% by weight repeating units to derived from styrene and from about 10% to about 40% by weight repeating units derived from acrylonitrile.

In an alternative preferred embodiment, the rigid polymeric superstrate comprises repeating units derived from one or more $(C_1-C_{12})$alkyl acrylate monomers, and may, optionally, further comprise is repeating units derived from one or more monomers selected from vinyl aromatic monomers and ethylenically unsaturated nitrile monomers. In another preferred embodiment, the rigid polymeric superstrate comprises greater than or equal to 50% by weight repeating units derived from one or more $(C_1-C_{12})$alkyl acrylate monomers, more preferably from one or more monomers selected from methyl methacrylate, ethyl methacrylate, propyl methacrylate, isopropyl methacrylate and butyl methacrylate.

The rubbery substrate and the rigid superstrate may each independently optionally include minor amounts, for example, up to about 15% by weight of the total weight of the respective substrate or superstrate, of repeating units derived from one or more other copolymerizable ethylenically unsaturated monomers. Illustrative examples of suitable copolymerizable unsaturated monomers include ethylenically unsaturated carboxylic acids such as, for example, acrylic acid, methacrylic acid, itaconic acid; hydroxy $(C_1-C_{12})$alkyl acrylate monomers such as, for example, hydroxyethyl methacrylate; $(C_4-C_{12})$cycloalkyl acrylate monomers such as for example, cyclohexyl methacrylate; (meth)acrylamide monomers such as, for example, acrylamide and methacrylamide; vinyl esters such as, for example, vinyl acetate and vinyl propionate. The $(C_4-C_{12})$cycloalkyl moiety above includes cyclic alkyl substituent groups having from about 4 to about 12 carbon atoms per group and the term (meth)acrylamide refers collectively to acrylamides and methacrylamides. Those skilled in the art can readily select other suitable copolymerizable ethylenically unsaturated monomers based, in part, on specific requirements for a particular composition.

The rigid polymeric superstrate may, optionally, include a minor amount, for example, up to about 3% by weight, more preferably up to about 1.5% by weight, of repeating units derived from one or more polyethylenically crosslinking monomers. Suitable crosslinking monomers are disclosed above.

The graft copolymer resin is made according to known processes by polymerizing one or more monomers selected to provide a rigid polymeric superstrate in the presence of particles of the rubbery polymeric substrate under conditions such that at least a portion of the rigid polymeric superstrate is chemically grafted to the rubbery polymeric substrate by covalent bonds. In a preferred embodiment, the superstrate monomers are polymerized by an aqueous emulsion or aqueous suspension polymerization reaction in the presence of substrate particles and a polymerization initiator system, for example, a thermal or redox initiator system wherein a portion of the polymerizing chains of the superstrate monomers are chemically bonded or grafted to the substrate via reaction with unsaturated sites in the substrate. The unsaturated sites in the substrate are provided, for example, by residual unsaturated sites in repeating units derived from a conjugated diene or by residual unsaturated sites in repeating units derived from a graft linking monomer. In a preferred embodiment, the graft copolymer resin is a high rubber graft copolymer resin. By the term high rubber graft is meant that greater than about 30% by weight, preferably greater than about 45% by weight of the rigid polymeric superstrate is chemically grafted to the rubbery polymeric substrate.

In a first preferred embodiment, the substrate comprises repeating units derived from one or more conjugated diene monomers, and may, optionally, further comprise repeating units derived from one or more monomers selected from vinyl aromatic monomers and ethylenically unsaturated nitrile monomers, and the superstrate comprises repeating units derived from one or more monomers selected from butadiene, vinyl aromatic monomers and ethylenically unsaturated nitrile monomers. The preferred graft copolymer resins include, for example, acrylonitrile-butadiene-styrene resins commonly referred to as "ABS" resins.

Especially preferred are acrylonitrile-butadiene-styrene copolymers having greater than 30% by weight rubbery polymeric substrate, preferably greater than about 45% by weight rubbery polymeric substrate. The most preferred rubbery substrates comprise polybutadiene or styrene-butadiene copolymer. Also preferred are high rubber graft acrylonitrile-butadiene-styrene copolymers. The phrase "high rubber graft" refers generally to graft copolymer resins wherein at least about 30% by weight, preferably at least about 45% by weight of the rigid polymeric phase is chemically bound or grafted to the rubbery polymeric phase. Suitable ABS-type high rubber graft copolymers are commercially available from, for example, GE Specialty Chemicals, Inc. under the trademark BLENDEX and include grades 131, 336, 338, 360, and 415.

In another preferred embodiment, the rubbery polymeric substrate comprises repeating units derived from one or more ($C_1$–$C_{12}$)alkyl acrylates and the superstrate comprises repeating units derived from one or more monomers selected from vinyl aromatic monomers and ethylenically unsaturated nitrile monomers, and include, for example, styrene-acrylate ("SA") high rubber graft copolymers and acrylonitrile-styrene-acrylate ("ASA") high rubber graft copolymers. Suitable ASA-type graft copolymers are commercially available from, for example, GE Specialty Chemicals, Inc. under the trademark BLENDEX and include grade 975, 977, and 980.

In a third preferred embodiment, the substrate comprises repeating units derived from one or more conjugated diene monomers and may, optionally, further comprise repeating units derived from one or more monomers selected from ($C_1$–$C_{12}$)alkyl acrylate monomers, vinyl aromatic monomers and ethylenically unsaturated nitrile monomers, and the superstrate comprises repeating units derived from one or more ($C_1$–$C_{12}$)alkyl acrylate monomers and may, optionally, further comprise repeating units derived from one or more monomers selected from vinyl aromatic monomers and ethylenically unsaturated nitrile monomers, such as, for example, methyl methacrylate-acrylonitrile-butadiene-styrene ("MABS") high rubber graft copolymers, methacrylate-butadiene-styrene ("MBS") high rubber graft copolymers. Suitable MBS-type graft copolymers are commercially available from Rohm and Haas Company under the trademark PARALOID and include grades BTA-733 and BTA-753 and from Kaneka Texas under the trademark KANE ACE and include grade B-56.

In another preferred embodiment, the superstrate comprises repeating units derived from one or more olefin monomers and may, optionally, further comprise repeating units derived from one or more non-conjugated diene monomers, and the superstrate comprises repeating units derived from one or more monomer selected from vinyl aromatic monomers and ethylenically unsaturated nitrile monomers, and include, for example, acrylonitrile-ethylene-propylene-styrene ("AES") high rubber graft copolymers.

In another preferred embodiment, the substrate comprises repeating units derived from one or more ($C_1$–$C_{12}$)alkyl acrylate monomer and the superstrate comprises repeating units derived from one or more ($C_1$–$C_{12}$)alkyl (meth)acrylate monomer, and include, for example, acrylic core-shell graft copolymers. Also included with the acrylic core-shell graft copolymers are butadiene modified acrylic copolymers. Suitable acrylic-type graft copolymers are commercially available from Rohm and Haas Company under the trademark PARALOID and include grades KM 334 and KM 355 and from Elf Atochem as grade Dura-strength 200.

The amount of graft copolymer resin in the present invention can vary widely depending on, for example, the viscosity and ductility desired, the chemical make-up of the graft copolymer resin, as well as the amount, type, and molecular weight of the polycarbonate resin employed. One of ordinary skill in the art can readily adjust the amounts of the ingredients without undue experimentation. Generally, the amount of graft copolymer resin to polycarbonate resin is in the range of about 2 percent by weight to about 85 percent by weight, preferably between about 3 percent by weight to about 30 percent by weight, based on the weight of the graft copolymer resin and polycarbonate resin combined.

The compositions of the present invention may optionally contain at least one thermoplastic polyester resin. Polyesters suitable for use in the present compositions are well known and include those comprising structural units of the formula (V):

wherein each $R^1$ is independently a divalent aliphatic, alicyclic or aromatic hydrocarbon or polyoxyalkylene radical, or mixtures thereof and each $A^3$ is independently a divalent aliphatic, alicyclic or aromatic radical, or mixtures thereof. Examples of suitable polyesters containing the structure of formula (V) are poly(alkylene dicarboxylates), elastomeric polyesters, liquid crystalline polyesters, polyarylates, and polyester copolymers such as copplyestercarbonates and polyesteramides. Also included are polyesters that have been treated with relatively low levels of diepoxy or multi-epoxy compounds. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 2 or 4 carbon atoms. The $A^3$ radical in the above formula (V) is most often p- or m-phenylene or a mixture thereof. This class of polyesters includes the poly(alkylene terephthalates), the poly(alkylene naphthalates) and the polyarylates.

The poly(alkylene terephthalates), for example, poly (ethylene terephthalate) (commonly abbreviated as "PET"), poly(cyclohexyldimethanol terephthalate) (commonly abbreviated as "PCT"), and poly(butylene terephthalate) (commonly abbreviated as "PBT") are examples of suitable polyesters for the present invention. Additional suitable polyesters include poly(alkylene naphthalate)s such as, for example, poly(alkylene-2,6-naphthalate)s including poly (butylene-2,6-naphthalate) (commonly abbreviated "PBN") and poly(ethylene-2,6-naphthalate) (commonly abbreviated "PEN"). Liquid crystalline polyesters having melting points less that about 380° C. and comprising recurring units derived from aromatic diols, aliphatic or aromatic dicarboxylic acids, and aromatic hydroxy carboxylic acids are also useful. Examples of useful liquid crystalline polyesters include those described in U.S. Pat. Nos. 4,664,972 and 5,110,896, which are incorporated herein by reference. Various mixtures of polyesters are also sometimes very suitable.

The range of thermoplastic polyester resin can vary widely depending, at least in part, on the end-use properties desired for the composition. When a polyester resin is utilized, it is commonly present in a range of about 5 to about 90 percent by weight, preferably between about 10 to about 80 percent by weight, and most preferably between about 30 to 70 percent by weight, wherein all weights are based upon the total weight of the composition. Determination of an exact amount can be readily determined without undue experimentation.

Compositions of the present invention can also include effective amounts of at least one additive selected from the group consisting of anti-oxidants, ultraviolet absorbers and ultraviolet stabilizers, flame retardants, drip retardants, crystallization nucleators, dyes, pigments, colorants, reinforcing agents, fillers, stabilizers, antistatic agents, plasticizers, processing aids, and lubricants. These additives are known in the art, as are their effective levels and methods of incorporation. Effective amounts of the additives vary widely, but they are usually present in an amount up to about 50% or more by weight, based on the weight of the entire composition.

All patents cited by reference are incorporated herein by reference.

In order that those skilled in the art will be better able to practice the invention, the following examples are given by way of illustration and not by way of limitation.

DETAILED DESCRIPTION OF THE PREFERRED EMBODIMENTS

The following examples and processing conditions are illustrative of the embodiments of the present invention. All blends in the following examples ere prepared on a twin screw extruder at approximately 260° C. melt temperature. ASTM parts were all injection molded at approximately 270° C. melt temperature. Compositions were molded under both normal and abusive molding conditions wherein under normal molding conditions, the residence time in the melt was about 80 seconds and under abusive conditions was about 320 seconds. Molded test specimens of the compositions were subjected to measurement of notched Izod impact strength according to ASTM D256 (employing a sample size of 2.5 inch by 0.5 inch by 0.125 inch), dart impact was measured accorded to ASTM D3763 (employing a sample size of a 4 inch diameter by 0.125 inch), and tensile yield and tensile elongation at break according to ASTM D638 using type I or type V test specimens. Melt viscosity (MVI) was measured according to ASTM D1238 and was determined using a 5 Kg load at about 260° C. and is presented in cc/10 minutes. All materials were dried in an oven at 110° C. for about 2 to 6 hours prior to viscosity measurement.

The materials employed in this Example as components parts (measured in parts by weight) were as follows:

PC an aromatic polycarbonate derived from bisphenol-A and a carbonyl chloride (phosgene) having a weight average molecular weight (Mw) between about 35,000 to about 60,000.

HRG a high rubber graft copolymer prepared by grafting a styrene-acrylonitrile copolymer onto a butadiene rubber in a 50/50 weight ratio.

SAN styrene-acrylonitrile copolymer (acrylonitrile to styrene ratio of 25:75, weight to weight), with a weight average molecular weight (Mw) of about 97,000.

GEL a crosslinked SAN

PHEN a hindered phenol available from Great Lakes under the trademark ANOX as grade PP18.

PHOS triphenyl phosphite available from Great Lakes under the trademark ALKANOX as grade 240.

PETS pentaerythritol tetrastearate available from Lonza under the trademark GLYCOLUBE P.

HALS a hindered amine available from Ciba-Geigy under the tradename TINUVIN as grade 770.

ASHA an acylated sterically hindered amide, 1-acetyl-4-(3-dodecyl-2,5-dioxo-1-pyrrolidinyl)-2,2,6,6-tetramethylpiperidine, available from Clariant Corporation under the tradename SANDUVOR as grade 3058.

The compositions in the examples were base on the following standard composition.

| PC | HRG | SAN | GEL | PHEN | PHOS | PETS |
|---|---|---|---|---|---|---|
| 63.46 | 15.86 | 14.87 | 4.96 | 0.30 | 0.30 | 0.25 |

Table 1 presents a comparison of physical properties under both normal and abusive molding conditions for the standard composition containing either a HALS or ASHA.

TABLE 1

| Sample: | 1 | 2 | 3 | 4 | 5 |
|---|---|---|---|---|---|
| Additive: | none | 0.5% ASHA | 1.0% ASHA | 0.5% HALS | 1.0% HALS |
| MVI @ 260° C. | 19.93 | 21.21 | 22.96 | 25.80 | 29.46 |
| N. Izod (ft-lbs/in) | | | | | |
| normal | 11.17 | 10.93 | 11.30 | 9.42 | 8.26 |
| abusive | 9.43 | 9.89 | 8.83 | 3.19 | 2.66 |
| Dart impact (ft-lbs) | | | | | |
| normal | 39.97 | 41.97 | 37.77 | 39.90 | 43.16 |
| abusive | 34.50 | 33.02 | 29.69 | 26.64 | 12.24 |
| Tensile strength (psi) | | | | | |
| normal | 6527 | 6674 | 6685 | 6448 | 6446 |
| abusive | 6478 | 6503 | 6477 | 6325 | 6258 |
| Tensile elongation (%) | | | | | |
| normal | 45.74 | 67.27 | 74.92 | 41.22 | 40.25 |
| abusive | 41.7 | 39.06 | 31.99 | 24.96 | 19.03 |

As seen by the above data, the ASHA results in markedly improved properties as compared to the same composition containing a HALS. For example, the MVI (melt viscosity index) is an indication of molecular weight changes in the resin. Preferably the compositions containing the HALS or ASHA would have a MVI very close to the control value. An increase in the MVI value is an indication of loss in molecular weight (i.e., degradation). As seen by samples 2 and 3, the increase in MVI is less than about 115% when compared to the control (calculated as MVI of sample with additive divided by MVI of sample 1 times one hundred). Sample 5, containing 1% HALS has almost a 50% increase to in the MVI value.

The loss in molecular weight as indicated by the MVI shift is also indicated by comparing the physical properties of molded test specimens. For example, the notched Izod impact strength on test samples molded under abusive molding conditions show a retention of impact strength of the control of greater than about 90% with the addition of the ASHA. For comparison, samples 4 and 5 containing HALS have a retention of less than about 35% of the notched Izod impact strength.

Similarly, for other physical properties, the retention is substantially improved with the addition of ASHA as compared to HALS.

What is claimed is:

1. A light resistant thermoplastic resin composition comprising:

(A) a polycarbonate resin;

(B) a vinyl aromatic graft copolymer resin; and (C) an acylated sterically hindered amide according to the structural formula:

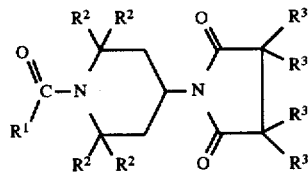

wherein $R^1$ is a $C_1$–$C_{20}$ residue, each $R^2$ is independently a $C_1$ to $C_{20}$ residue, and each $R^3$ is independently hydrogen or a $C_1$ to $C_{25}$ residue with the proviso that at least one $R^3$ is a $C_1$ to $C_{25}$ residue.

2. The composition of claim 1, wherein $R^1$ and each $R^2$ are methyl and three of $R^3$ are hydrogen and the fourth $R^3$ is a $C_1$ to $C_{25}$ residue.

3. The composition of claim 1, wherein the acylated sterically hindered amide is:

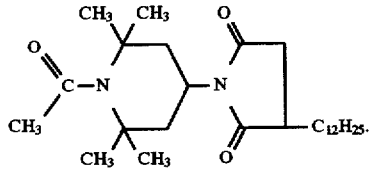

4. The composition of claim 1, wherein the increase in MVI is less than about 115% when compared to a control not containing the acylated sterically hindered amide.

5. The composition of claim 1, wherein the notched Izod impact strength of molded specimens molded under abusive conditions is at least about 90% of a control not containing the acylated sterically hindered amide.

6. The composition of claim 1, wherein said graft copolymer resin is an acrylonitrile-butadiene-styrene resin.

7. The composition of claim 6, wherein said acrylonitrile-butadiene-styrene resin contains a high rubber graft copolymer.

8. The composition of claim 1, further comprising at least one thermoplastic polyester resin.

9. The composition of claim 1, further comprising at least one additive selected from the group consisting of antioxidants, ultraviolet absorbers and ultraviolet stabilizers, flame retardants, drip retardants, crystallization nucleators, dyes, pigments, colorants, reinforcing agents, fillers, stabilizers, antistatic agents, plasticizers, processing aids, and lubricants.

10. A light resistant thermoplastic resin composition consisting essentially of:

(A) a polycarbonate resin;

(B) a vinyl aromatic graft of copolymer resin; and (C) an acylated sterically hindered amide according to the structural formula:

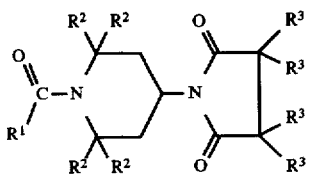

wherein $R^1$ is a $C_1$–$C_{20}$ residue, each $R^2$ is independently a $C_1$ to $C_{20}$ residue, and each $R^3$ is independently hydrogen or a $C_1$ to $C_{25}$ residue with the proviso that at least one $R^3$ is a $C_1$ to $C_{25}$ residue.

11. A light resistant thermoplastic resin composition consisting essentially of:

(A) a polycarbonate resin;

(B) a vinyl aromatic graft copolymer resin;

(C) an acylated sterically hindered amide according to the structural formula:

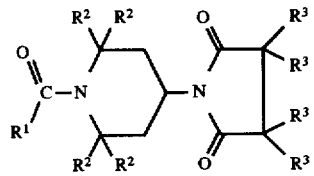

wherein $R^1$ is a $C_1$–$C_{20}$ residue, each $R^2$ is independently a $C_1$ to $C_{20}$ residue, and each $R^3$ is independently hydrogen or a $C_1$ to $C_{25}$ residue with the proviso that at least one $R^3$ is a $C_1$ to $C_{25}$ residue; and (D) at least one thermoplastic polyester resin.

* * * * *